UNITED STATES PATENT OFFICE.

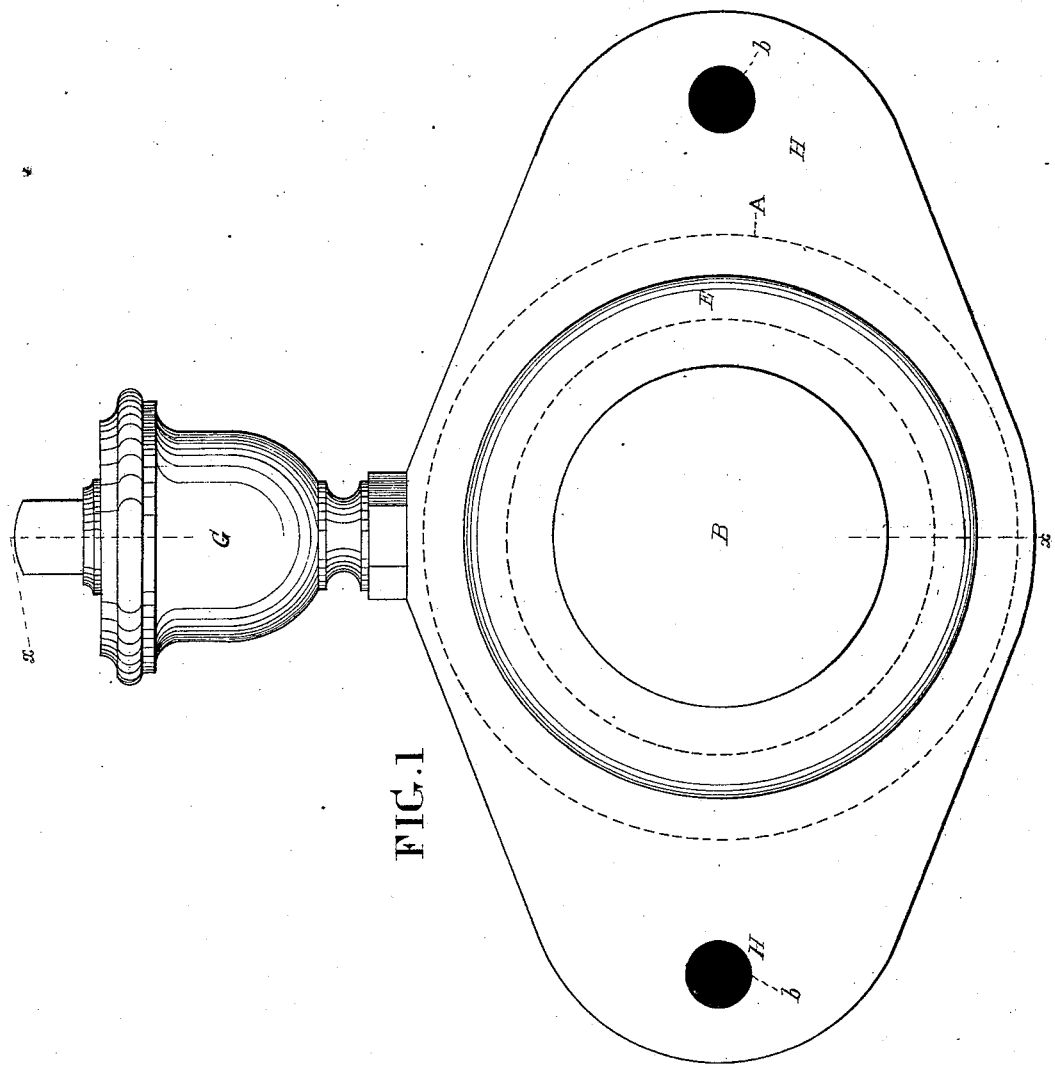

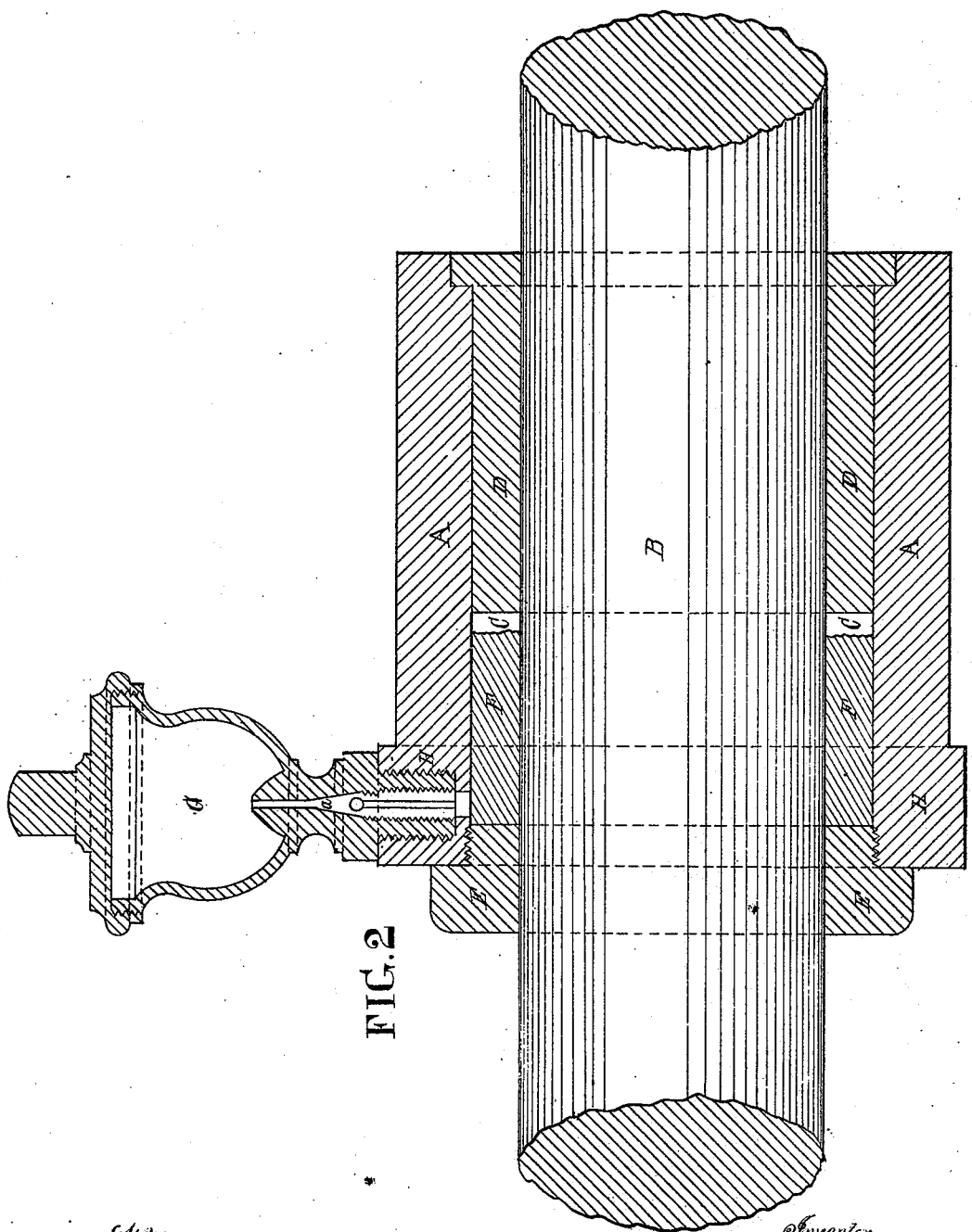

SOL. HOFFMASTER, OF HARRISBURG, PENNSYLVANIA.

IMPROVEMENT IN LUBRICATORS FOR PISTON-RODS.

Specification forming part of Letters Patent No. 161,614, dated April 6, 1875; application filed January 4, 1875.

*To all whom it may concern:*

Be it known that I, SOL. HOFFMASTER, of Harrisburg, in the county of Dauphin and State of Pennsylvania, have invented an Improvement in Lubricators for Piston-Rods, of which the following is a specification:

I am aware that fibrous material has been used in stuffing-boxes for piston-rods as a packing, as in the patents of Emile Lamn, dated March 12, 1872, (air and gas engine,) and Wm. Helon, July 22, 1873, (piston-packing;) but I am not aware that lubricating pads have been used in the manner represented in my accompanying drawings, and as hereinafter described.

My invention relates to a gland having between its inner periphery and the piston-rod an oil-distributing pad formed of waste or other suitable material for the gradual passage of the oil to the piston-rod which the pad surrounds. The oil is automatically fed to the pad from an oil-cup connected with the upper side of the gland. The pad is held in its place around the piston-rod by means of a bushing at one end of the gland, and a nut in the other, as hereinafter described.

In the accompanying drawings, Figure 1 is a front view of the gland A, having an oil-cup, G. Fig. 2 is a longitudinal vertical section at the line *x x* of Fig. 1.

Like letters of reference in all the figures indicate the same parts.

A is the gland, whose inner diameter is larger than the diameter of the piston-rod B, so as to form an annular chamber, C, between the front end of the bushing D and the rear end of the nut E, for the reception of the distributing-pad F, formed of waste or other suitable material, through which oil may be caused to flow gradually, and distributed evenly upon the piston-rod during its reciprocating movements. G is an oil-cup, (connected with the upper side of the gland A,) from which the oil descends by its gravity through the central opening *a* to the pad F, for keeping up a regular supply of oil thereto, as it is distributed thereby upon the piston-rod. H is a flange on the front end of the gland A, having holes *b b* for the reception of bolts for confining the gland to the cylinder-head. To form the pad F the nut E is unscrewed, and the waste or other material placed in proper quantity in the chamber or space C. Then the nut is replaced and screwed up to its place, whereby the pad is secured between the nut and the front end of the bushing D, as shown in Fig. 2.

I claim as my invention—

The gland A, having a bushing, D, and nut E, forming the annular chamber C around the piston-rod, for the reception and retention of the pad F, the oil being supplied from the oil-cup G, or other reservoir, substantially as described.

SOL. HOFFMASTER.

Witnesses:
WM. A. BRYDEN,
EUGENE SNYDER.